(12) United States Patent
Sturgis

(10) Patent No.: US 7,574,091 B2
(45) Date of Patent: Aug. 11, 2009

(54) FIBER WRAP DESIGN AND METHOD

(75) Inventor: Silversun Sturgis, Socorro, NM (US)

(73) Assignee: Associated Universities, Inc., Washington, DC (US)

( * ) Notice: Subject to any disclaimer, the term of this patent is extended or adjusted under 35 U.S.C. 154(b) by 0 days.

(21) Appl. No.: 11/925,464

(22) Filed: Oct. 26, 2007

(65) Prior Publication Data

US 2009/0110357 A1 Apr. 30, 2009

(51) Int. Cl.
*G02B 6/26* (2006.01)
*G02B 6/00* (2006.01)
*B65H 54/02* (2006.01)

(52) U.S. Cl. .................. 385/134; 385/25; 385/26; 385/139; 242/472.6

(58) Field of Classification Search .................. None
See application file for complete search history.

(56) References Cited

U.S. PATENT DOCUMENTS

| 4,228,966 A | 10/1980 | Croese | |
|---|---|---|---|
| 4,953,803 A * | 9/1990 | LeCompte | ............... 242/472.6 |
| 5,078,466 A | 1/1992 | Macculloch | |
| 5,237,640 A | 8/1993 | Pedraza | |
| 6,415,085 B1 | 7/2002 | Graham et al. | |
| 6,434,293 B1 | 8/2002 | Igeta et al. | |
| 6,819,854 B1 | 11/2004 | Young et al. | |
| 2007/0184934 A1 | 8/2007 | Zhang et al. | |

FOREIGN PATENT DOCUMENTS

| DE | 3440209 | 5/1986 |
|---|---|---|
| DE | 3440209 A1 * | 5/1986 |

OTHER PUBLICATIONS

Nelson, et al. Introduction to polarization mode dispersion in optical systems. J. Opt. Fiber. Commun. Rep. 1. 312-344 (2004).

* cited by examiner

*Primary Examiner*—Omar Rojas
(74) *Attorney, Agent, or Firm*—Novak Druce & Quigg LLP

(57) ABSTRACT

A fiber wrap and a method of rotating the fiber wrap without twisting a data cable are disclosed. The fiber wrap includes a sun gear, a sun cylinder coupled to the sun gear, a planetary gear in contact with the sun gear, a planetary cylinder coupled to the planetary gear, an outer housing in contact with the planetary gear, and a data cable coupled to the sun cylinder, the planetary cylinder, and the outer housing. The data cable is coupled in such a way as to only bend the data cable during use of the fiber wrap.

28 Claims, 5 Drawing Sheets

FIBER WRAP DESIGN AND METHOD

BACKGROUND

1. Field of the Invention

The invention is directed to a fiber wrap design, and more particularly to a rotary cable wrap which communicates a cable or cables from a stationary base to a rotating element.

2. Background of the Invention

Rotary cable wraps for the communication of signals via cable from a fixed to a movable, or rotating point are used in a variety of applications, where a rotating receiver, such as a radio receiving antenna is used, mounted to a fixed base unit. Other applications include robotics, such as a manipulator arm rotating about a fixed base, for example.

Other technology exists for transmitting signals from a rotational portion to a fixed portion. A slip ring is often used to transmit signals or power to a number of different destinations. Slip rings are generally either drum style or pancake style. In either case, an element called a rotor interacts with an element called a brush to allow electrical signals to pass between them. Slip rings are generally suitable for communicating electrical signals, but are not intended for communicating (fiber) optical signals. Due to the increased capacity of fiber optics, many more channels/signals can be sent than with traditional electrical wiring, and so the slip ring is not suitable where fiber optics is used.

Whether a slip ring or other electrical connection is used to transmit signals over a rotating joint, there is a risk of data loss or signal degradation at the switch joint. Additionally, these joints are complex, expensive to repair and maintain, and may not be necessary for certain applications.

A light wave traveling in free space has an electric field which is always orthogonal to the propagation direction (z-axis). The oscillations of the electric field are always transverse, with $E_z(t)=0$. When the light wave is transmitted in an optical waveguide, such as fiber, this relation is not true. However, for weakly-guiding structures, such as fiber, $E_z(t)=0$ is still a good approximation to only consider the transverse components of the field, $E_x(t)$ and $E_y(t)$. The vector $\{E_x(t), E_y(t)\}$ is called the Jones Vector. The Jones Vector defines unambiguously the state of polarization (SOP) of the light wave. Another popular description of the SOP of light waves is the Stokes vector. For geometrical representation, the Polarization Ellipse and Poincare Sphere are often used. More details about the definitions and relations of these parameters for representing the SOP of light waves can be found elsewhere in text books on optics (for example, Born and Wolf, Principles of Optics).

For a Local Oscillator (LO) reference signal, attenuation and chromatic dispersion may be respectively accounted for by selecting the correct launching power and using a highly stable phase-locked source. Fiber nonlinearity effects on an LO signal have not been rigorously studied so far, but given low peak optical power in the transmission, nonlinearity will not be a serious problem. In addition to these effects, the Polarization mode dispersion (PMD) can disturb a transmitted light wave.

PMD arises from the anisotropic nature of the fiber/waveguide cross-section. In general, two orthogonal polarization modes are supported in a fiber. The slight asymmetries cause the light in the two polarization modes to travel at slightly different speeds. PMD denotes the effect of the different group propagation velocities of the fast and slow components of the signal. The effects arise from the intrinsic PMD caused by the non-circular core due to fabrication and the cabling processes, and the extrinsic PMD caused by external factors such as the external mechanical and thermal stress. The inherent asymmetries of the fiber are fairly constant over time, while the mechanical stress due to the movement of the fiber can vary, resulting in a dynamic change in the PMD.

Due to the fiber asymmetries, the group delay along a fiber is a function of the polarization of the input signal. If the input light is coupled both into the fast- and slow-axes of the local fiber section (whether Polarization maintaining (PM) or single mode (SM) fiber), the wave will split and propagate at two different velocities. Depending on the distribution of asymmetries along the fiber length, the group velocities of fast- and slow-axes, and the output SOP can change.

For a short fiber section without varying external perturbation or a short optical waveguide based component, a uniform elliptical core along its length can be assumed. Therefore only intrinsic PMD appears. Although the output SOP will change as a function of the input SOP, wavelength and fiber length, there is no power transformation between the fast and slow components. (The power transformation is called mode coupling). If the light is launched with an input SOP aligned to one of the principal axes of such a uniform optical waveguide, the waveguide can be treated similarly to a PM fiber, simply because there is no coupling between components polarized along the fast and slow axes. In such a short fiber/waveguide, the Differential Group Delay (DGD) between the fast- and slow-axes is constant with time, and wavelength. In this case the PMD is deterministic. The short fiber acts like a birefringent crystal with a fixed PMD value. The DGD increases linearly with the fiber length, providing the fiber is kept straight, is not twisted, is kept from varying tension and stress, and its length is short. The relation between the DGD value and the fiber length is described by the PMD coefficient. The intrinsic PMD coefficient for a short piece of telecom SM fiber depends strongly on the fiber type, and can be characterized by its beat length, i.e., the distance needed for a phase difference of $2\pi$ between polarization modes. Beat lengths of SM fiber range from a few centimeters in older fibers to meters in today's telecom fiber, the latter corresponding to a PMD coefficient of fs/m. High birefringence fiber (HBF), such as Panda fiber which has a PMD coefficient of 1-2 ps/m can be used as PM fiber, and has a beat length of the order of a millimeter. Meanwhile low birefringence fiber (LBF) also exists on the market, and this has a beat length of longer than 50 m. This type of fiber is manufactured with near perfect circular cores and has been used as PM fiber over short lengths in component manufacture.

When a short fiber is bent uniformly along its length, the perturbation induced can become dominant over intrinsic factors. The PMD in this case increases linearly with the length, and also as a function of the bending. The bending induced PMD coefficient varies depending upon fiber type. Values around 10/R (fs cm/360° turn) are expected, where R is the radius of bending given in cm. For a SM28 fiber with 10 cm bending radius, 0.17 fs/m is a typical value at 1550 µm.

The SOP of the light traveling inside SM fibers is very sensitive to external stresses. With less than one meter of SM fiber, one SOP can be converted to another SOP without significant bending/twisting of the fiber. A relative delay in the x- and y- components as small as 1.5 fs is enough to convert from a linear SOP to a circular SOP. Practically, this is used to make polarization converters (polarization controllers).

For a long length of fiber or a short fiber but with irregular perturbation, the birefringence along its length varies owing to manufacturing variations and externally applied perturbations originating from the bends, twists, stresses and temperature changes in the fiber. These perturbations are usually random along the fiber length. As a result, the polarization will rotate and couple in different proportions between the fast and slow axes. Some of the power launched in the fast polarization mode couples into the slow mode in later lengths of the fiber and vice versa. These random mode couplings tend to equalize the propagation times of the two polarization modes, thereby reducing PMD. For long telecom fiber with random coupling, the PMD coefficient is given in units of ps/km$^{1/2}$, as the PMD increases as the square root of length. Methods to reduce the PMD coefficient include decreasing the fiber birefringence during manufacture or increasing the mode coupling by using techniques such as twisting the fiber with several twists per meter.

The PMD is often closely associated with the term Differential Group Delay (DGD). DGD is defined by the time delay between the components along the fast and slow Principal States of Polarization (PSPs). In a long fiber, the PSPs are just the SOPs where the light travels at its fastest and slowest. In PM fiber, the PSPs correspond to the linear SOPs along the fast and slow axes. For a long fiber link with random mode coupling, the DGD is instantaneous and varies randomly with wavelength and time.

The average of the DGD distribution is defined by the ITU standard bodies as the PMD value. The average DGD measured over time or wavelength results in the same PMD value, according to random mode coupling theory. Measurement of the time average is, however, generally impractical and therefore the wavelength average is normally used. Therefore, a PMD value is independent of time and wavelength, as the PMD value is the result of an average over a long time or wide wavelength range. The value of the PMD of a fiber is referred to as first-order PMD.

Second-order PMD is defined as the DGD dependency on wavelength. The Second-order PMD includes the Polarization dependent Chromatic Dispersion (PCD), which is the magnitude of the DGD changes with wavelength, and the Depolarization Rate, which describes the rotation of the DGD or PSP. If the first-order PMD is reduced towards zero, second-order PMD is generally considered significant in longer-term statistical variations in signals. For a stable fiber, the PCD gives a phase bias of the delivered signal, in the way that the CD affects the phase. In LO delivery, the second-order PMD effect still needs to be studied, but is expected to have very limited effects for low PMD fiber.

For long single mode fiber, the PSPs are not necessarily linear SOPs, and the output PSPs are generally not the same as the input PSPs. Under the condition of zero Polarization Dependent Loss (PDL), the two PSPs are orthogonal to each other. In this case there is no coupling between the two PSPs—if light is launched into one of the input PSPs, then the light will not suffer polarization related temporal dispersion. However, for long/varying fiber, the PSPs are wavelength dependent, and their magnitude and orientation also vary randomly in time and wavelength, so consistently launching into an input PSP becomes difficult.

A PMD vector is also defined on the Poincare Sphere. The PMD vector has a magnitude of the DGD, and takes the direction of the PSPs. For long fiber with random perturbation, the PMD vector is a function of time, length and optical frequency. The PMD vector relates the change in output SOP $\underline{S}$ with optical frequency $\omega$ as $$\frac{d\underline{S}}{d\omega} = \underline{\Omega} \times \underline{S}$$

where $\underline{S}$ is the output SOP vector and $\underline{\Omega}$ is the PMD vector.

The output SOP precesses about the PMD vector at the rate of the DGD as the frequency $\omega$ is changed. The PMD of other optical components can come from the birefringence/disturbance of any fiber pigtails, or from the component itself, such as that arising in optical isolators/circulators. Simulations have shown that the PMD in such components is due to the mismatch between different PSP paths within the component, rather than by birefringence along the same path. The PMD value of conventional optical isolators ranges from 100 fs to 500 fs. Newly developed PMD compensated optical isolators have lower PMD, typically less than 50 fs; the best on the market is specified at less than 20 fs.

Another case is for a small number of optical components cascaded together. As each component presents a section with differing birefringence, they also show partly random coupling behavior. But if the number of sections is small, and they are kept relatively stable, then no change of DGD or PSP with time should be observed. The DGD distribution characteristic is Gaussian for this kind of mode coupling.

U.S. Pat. No. 5,078,466, issued Jan. 7, 1992, is an example of a rotary joint having a pair of coaxial and radially congruent surface-defining bodies which are relatively rotatable. The bodies are flexible shape-retaining ribbon which interacts with the cable as the rotational portion of an equipped device increases or decreases the length of cable wrapped within the bodies.

U.S. Pat. No. 6,819,854, issued Nov. 16, 2004, is an example of rotary joint with a central entrance for the optical cable. A rotary hub unit contains a length of coiled cable or conduit. An angular transition cable transmits a signal between a first junction and a second end junction.

What is absent in the art is an on-axis cable wrap that allows for a prescribed range of motion of a rotating member, which smoothly communicates cable stored within the rotating member and preserves the cable signal polarization without the complexity of an electronic junction between the stationary and rotating elements.

SUMMARY OF THE INVENTION

The present invention overcomes the problems and disadvantages associated with current strategies and designs and provides new tools and methods of controlling adhesive migration and, in particular, migration in an assembly.

One embodiment of the present invention comprises a fiber wrap that includes a sun gear, a sun cylinder coupled to the sun gear, a planetary gear in contact with the sun gear, a planetary cylinder coupled to the planetary gear, an outer housing in contact with the planetary gear, and a data cable coupled to the sun cylinder, the planetary cylinder, and the outer housing, wherein the data cable only bends during use of the fiber wrap.

In another embodiment, the data cable is not twisted.

In another embodiment, there is a hollow axle that is coupled to the sun gear, through which the data cable passes.

In another embodiment, the sun cylinder is comprised of an upper portion and a lower portion, wherein the upper portion and the lower portion are coupled together.

In another embodiment, the upper portion of sun cylinder has a smaller diameter than the lower portion of sun cylinder.

In another embodiment, the upper portion and lower portion of sun cylinder are two distinct units.

In another embodiment, the lower portion of the sun cylinder has a slot extending from the center of the sun cylinder to the outer edge of the lower portion of the sun cylinder though which the data cable passes.

In another embodiment, the upper surface of the lower portion of the sun cylinder has a grove in which the data cable sits.

In another embodiment, the upper portion of sun cylinder has a channel in the outer surface in which the data cable sits.

In another embodiment, the data cable is a fiber optics cable, wherein the data cable is a 0.9 mm cable, a 1.8 mm cable, a 2.0 mm cable, 2.4 mm cable, a 2.8 mm cable, or a 3.0 mm cable.

In another embodiment, the inner surface of the outer housing has a channel in which the data cable sits.

In another embodiment, a low friction slip ring to hold the data cable in the channel in the inner surface of the outer housing, wherein the coefficient of friction between the slip ring and the outer housing is less than 0.3, 0.2, or 0.1.

In another embodiment, a transparent cover is coupled to the outer housing, wherein the axle extends through the cover.

Another embodiment of the present invention comprises a method of rotating a fiber wrap without twisting a data cable. The invention includes the steps of passing the data cable through a central axle, passing the data cable out of the central axle into a slot in a lower portion of a sun cylinder, wrapping the data cable at least part way around the lower portion of the sun cylinder, routing the data cable into a grove on a face of the lower portion of the sun cylinder, passing the data cable into a channel in the outer surface of an upper portion of the sun cylinder, wrapping the data cable around the upper portion of sun cylinder at least one time, passing the data cable into a channel in the surface of a planetary cylinder, wrapping the data cable at least partly around the planetary cylinder, passing the data cable into a channel in an inner surface of an outer housing, and passing the data cable through a slot in the outer housing.

In another embodiment, only a portion of the data cable is in motion while the fiber wrap is in operation.

In another embodiment, the data cable is one of a 0.9 mm cable, a 1.8 mm cable, a 2.0 mm cable, 2.4 mm cable, a 2.8 mm cable, and a 3.0 mm cable.

In another embodiment, a low friction slip ring holds the data cable in the channel in the inner surface of the outer housing, wherein the coefficient of friction between the slip ring and the outer housing is less than 0.3, 0.2, or 0.1.

In another embodiment, a transparent cover is coupled to the housing, wherein the axle extends through the cover.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention is minimizing polarization drift in a rotating fiber wrap. It is surprisingly discovered that by eliminating twisting of a data cable, polarization drift can be minimized. In one embodiment of the present invention, a planetary/sun gear system may be utilized to minimize or completely eliminate polarization drift due to twisting of a data cable. The data cable may enter the system through a hollow central axle, wrap around two or more cylinders coupled to each gear, and, finally, exit the system through a hole in the outer housing of the system. As the system operates, the data cable may wrap and unwrap from the cylinders, thereby bending the cable without twisting the cable.

Figure 1:
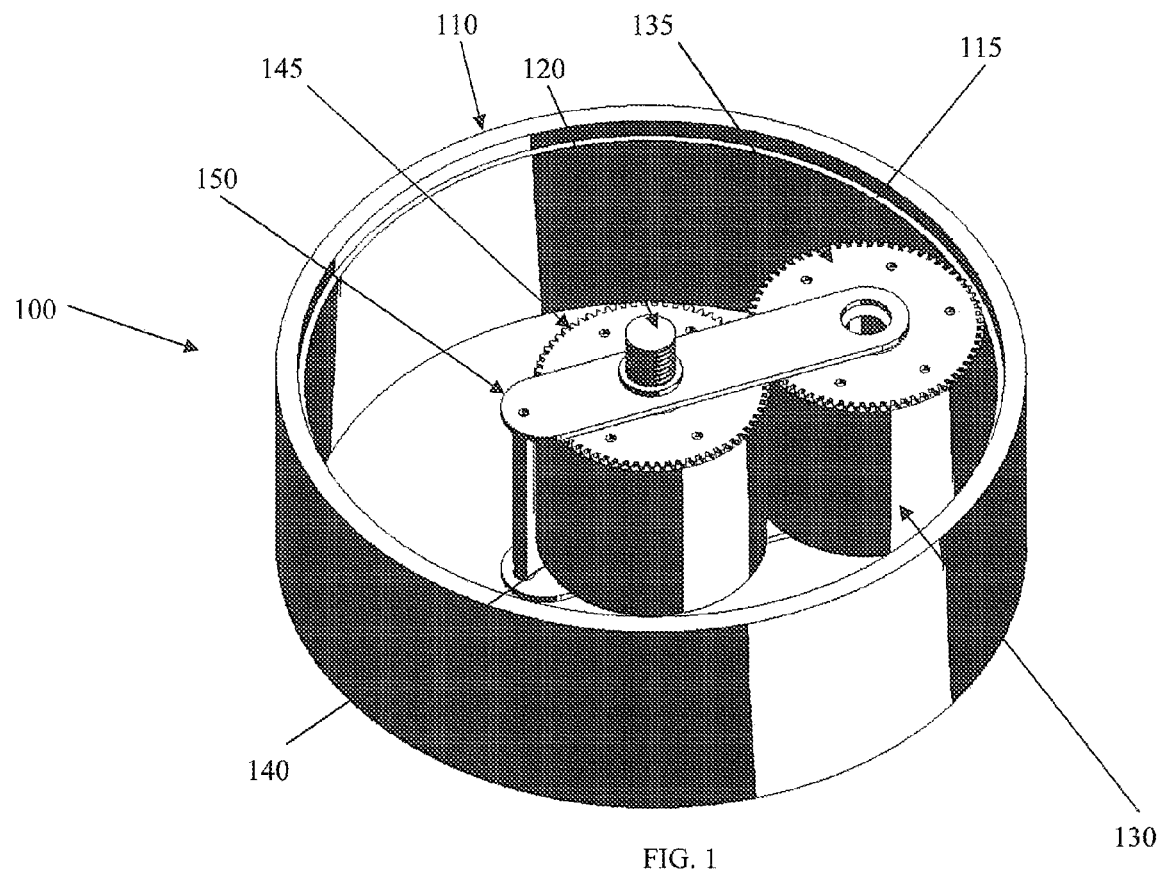
FIG. 1 is an image of the general configuration of the fiber wrap.

FIG. 1 is an image of the general configuration of the fiber wrap 100. Fiber wrap 100 uses a planetary/sun gear system. While the embodiment in FIG. 1 shows one planetary gear 135, any number of planetary gears can be used. Fiber wrap 100 may consists of an outer housing 110 to which an internal gear 115 may be coupled. The teeth of internal gear 115 may mesh with the teeth of planetary gear 135. Planetary gear 135 may be coupled to planetary cylinder 130, around which a cable (not shown) may be wound.

The teeth of planetary gear 135 may also mesh with the teeth of sun gear 145. Sun gear 145 may be coupled to sun cylinder 140, around which a cable (not shown) may be wound. Sun gear 145 and sun cylinder 140 may have an axle 120 coupled to the middle of them. Axle 120 may be hollow to allow a cable (not shown) to pass through its center. Fiber wrap 100 may also include a planetary gear arm 150 that couples planetary gear 130 and planetary cylinder 130 with sun gear 145 and sun cylinder 140. Planetary gear arm 150 may be in any shape, including but not limited to a circle, an "X", a star, etc.

Figure 2:
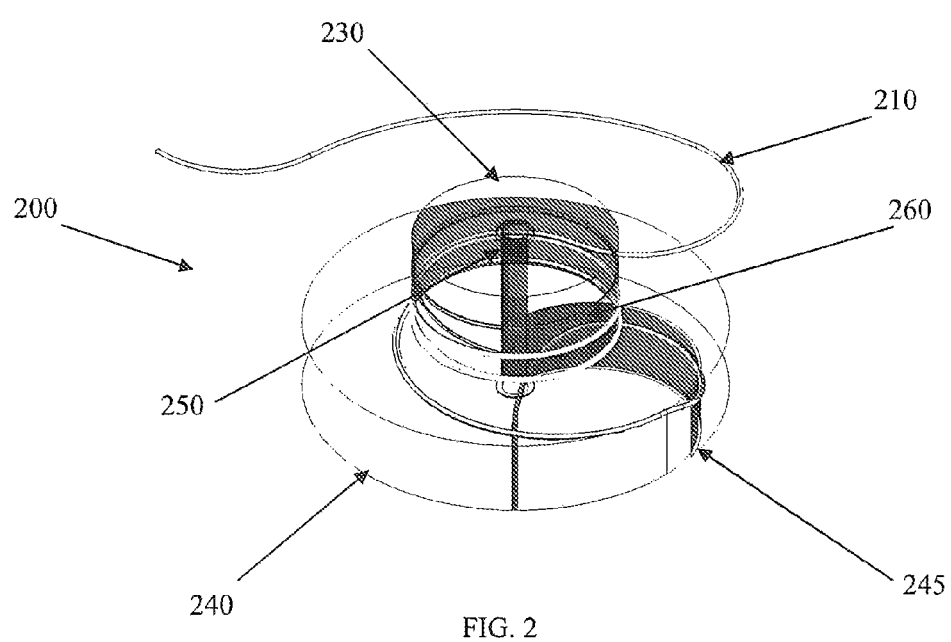
FIG. 2 is an image of the data cable wrapped around the sun cylinder.

FIG. 2 is an embodiment of the sun cylinder 200. Sun cylinder 200 may consist of an upper portion 230 and a lower portion 240. Lower portion 240 may have a greater diameter than upper portion 230. Lower portion 240 may include a slot 245 extending from the center of sun cylinder 200 to the outer edge of lower portion 240. Slot 245 may be semicircular or any other shape capable of holding cable 210. Upper portion 230 may include a channel 260 cut into the outer circumference of upper portion 230. Channel 260 may spiral from the upper surface of lower portion 240 to the upper edge of upper portion 230.

Cable 210 may enter sun cylinder 200 through a hole in axle 250. Cable 210 may be any cable capable of transmitting data, including but not limited to fiber optics or metal electrical cables. Cable 210 may be of any gage, including but not limited to a 0.9 mm cable, a 1.8 mm cable, a 2.0 mm cable, 2.4 mm cable, a 2.8 mm cable, or a 3.0 mm cable. Cable 210 may then travel along slot 245 to the outer surface of lower portion 240. Cable 210 then proceeds along a grove (not shown) on the face of lower portion 240. From there, cable 210 may wrap around upper portion 230 at least one time by engaging channel 260, without crossing over itself.

Figure 3:
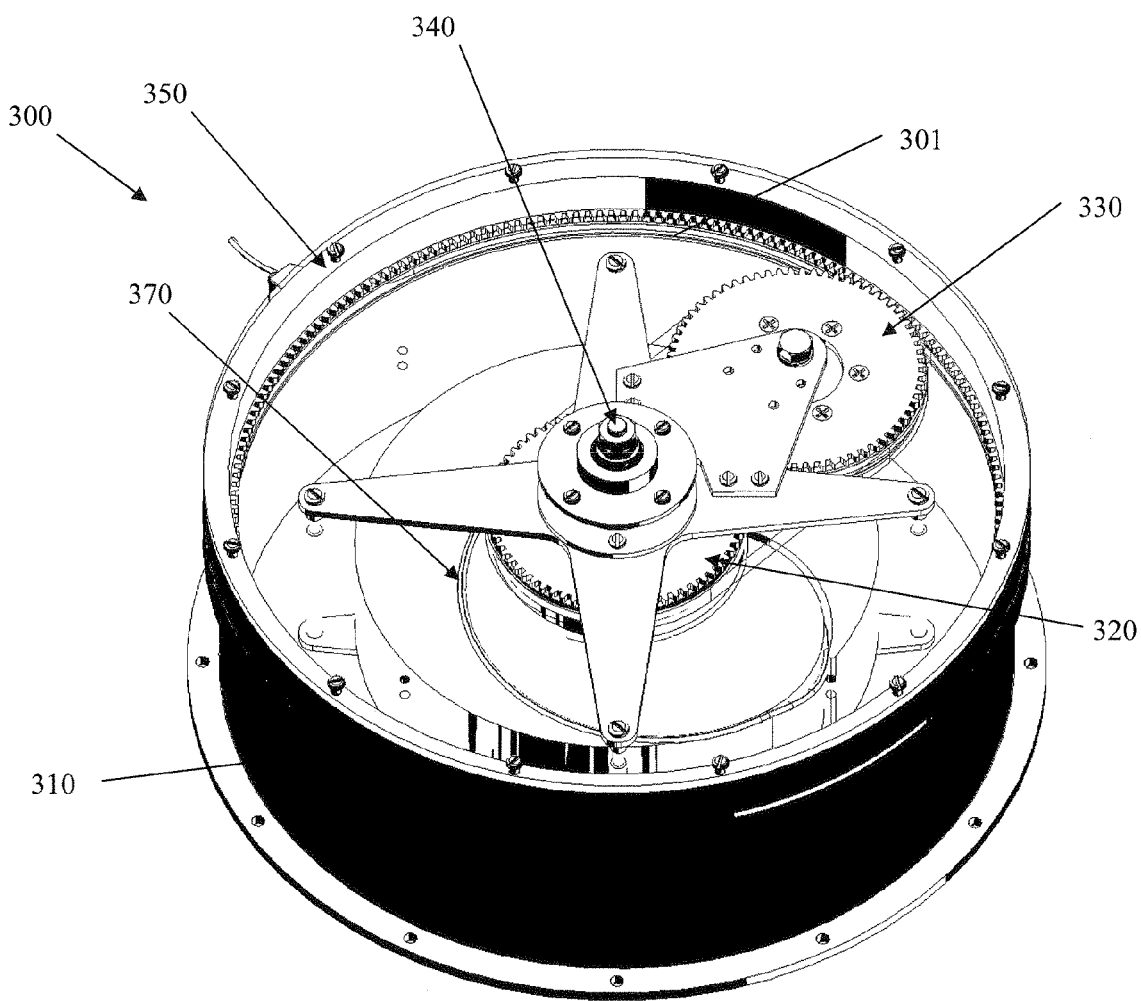
FIG. 3 is an image of a completed embodiment of the fiber wrap.

FIG. 3 is an embodiment of an assembled fiber wrap 300. After wrapping around the sun cylinder 320 (as described with respect to FIG. 2), cable 370 may engage a channel in planetary cylinder 330 and may wrap at least partly around planetary cylinder 330. Cable 370 then may engage a channel 301 on the inner surface of housing 310. Finally, cable 370 may exit housing 310 through a hole in housing 310. Cable 370 may be held in place by a nylon slip ring.

As can be seen in FIG. 3, fiber wrap 300 may have a cover 350 that is attached to housing 310 and through which axle 340 extends. Cover 350 may be translucent, transparent or opaque. Cover 350 may allow viewing of fiber wrap 300 to ensure cable 370 is in the proper position and fiber wrap 300 is functioning properly. In such embodiments, front cover 350 may be made of Lexan®, polymethyl methacrylate, or any other transparent material.

Figure 4:
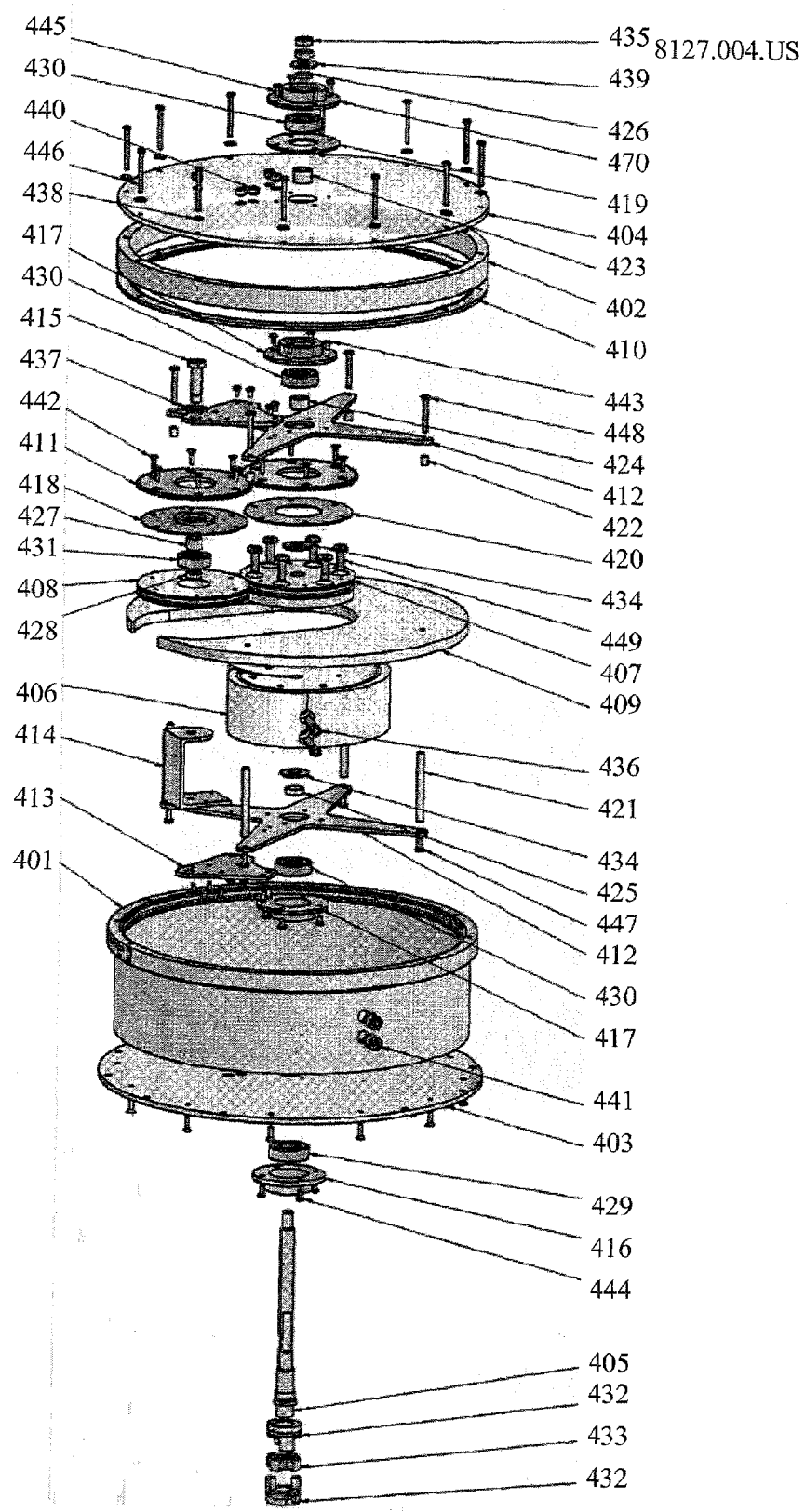
FIG. 4 is an exploded view of a complete embodiment of the fiber wrap.

FIG. 4 is an exploded view of a complete embodiment of the fiber wrap. The cable wrap may include urethane spider 433 sandwiched between spider coupling hubs 432, engaging one end of main axle 405. Main axle 405 may be inserted through bearing pocket 416, which may support bearing 429. Bearing pocket 416 may be secured to backside cover 403 by a plurality of fasteners 444. Backside cover 403 may be attached to housing 401 by a plurality of fasteners 442.

Housing 401 may further contain a plurality of set screws 441 located about the outer surface of housing 401. Also connected to main axle 405 may be bearing pocket 417, which holds bearing 430 and may be connected to support arm 412 by a plurality of fasteners 443. Fasteners 447 may connect standoffs 421 to support arm 412. Planetary arm brace 414 is connected to bolt-on arm 413 and support arm 412 by fasteners 443. Spacer 425 may engage bearing 430 and thrust washer 434, as well as main axle 405.

Figure 5:
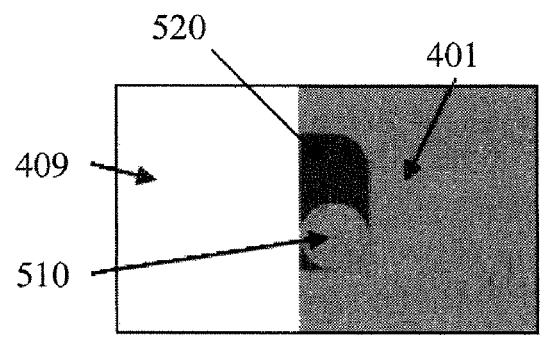
FIG. 5 is an image of the data cable being held in place by a slip ring.

Sun cylinder lower portion 406 may engage with main axle 405 and include a plurality of screws 436 arranged about its outer surface. Slip ring 409 may include a plurality of attachment locations for fasteners 448 which may connect a second support arm 412 to slip ring 409, using standoffs 422 for proper spacing. Looking at FIG. 5, slip ring 409 may abut housing 401, which may have a grove 520 cut into housing 401 in which fiber 510 may sit. Slip ring 409 may be made of Teflon, Teflon infused metal, or any other low friction material, wherein the coefficient of friction between slip ring 409 and housing 401 is less than 0.3, 0.2, or 0.1.

Looking back to FIG. 4, planetary cylinder 408 may engage sun cylinder upper portion 407, through which passes main axle 405. A plurality of fasteners 449 may secure sun cylinder upper portion 407 to sun cylinder lower portion 406. Thrust washer 434 may engage main axle 405 and sun cylinder upper portion 407. Planetary axle 415 may support washer 437, bolt-on planetary arm 413, bushing 427, bearing 431, spacer 428, and then may engage planetary arm brace 414.

Mounted to planetary cylinder 408 may be bearing pocket 418, which may support bearing 431,and one of two spur gears 411, by a plurality of fasteners 442. The first spur gear 411 may also engage the second spur gear 411, which is mounted to sun cylinder upper portion 407 and sun gear spacer 420 by a plurality of fasteners 442. Spacer 424 may engage main axle 405 and bearing 430. Bearing pocket 417 may support bearing 430 and may be attached to support arm 412 with fasteners 443.

Mounted to housing 401 may be a sub-assembly that includes internal spur gear 410, internal gear spacer 402, and front-side cover 404. These elements may be connected to each other by fasteners 446, with washers 438. Main axle 405 may pass through the center of the subassembly, engaging spacer 423, bearing plate 419, bearing 430, bearing pocket 470, spacer 426, washer 439 and hex nuts 435. Bearing pocket 470 may be secured to front-side cover 404 with fasteners 445.

The following examples illustrate embodiments of the invention, but should not be viewed as limiting the scope of the invention.

EXAMPLES

For example, the planetary cylinder and the sun cylinder may have equal radii, r. The bend radius at the end of the wrap motion is $R_1$, while the bend radius at the start of the wrap motion is $R_2$, wherein $R_1=3R_2$. The rotation of the wrap is $\theta$, and the orbiting angle of the planetary cylinder is $\phi$. The fiber length that is wrapped on the central cylinder may be equal to the length released from the surface of the outer cylinder. Therefore, $-R_1\phi+R_2(\theta-\phi)=0$ and $\phi=-0.5\theta$.

In this example, the length of the fiber undergoing change in bend radius will be the section of the fiber under the transition to or from the central cylinder. Only half of a cycle of the fiber will undergo this transition for a 360° rotation.

For a small rotation of 20°, only 10° of extra fiber is wound on the central cylinder. The length of the fiber under this transition is therefore:

$$\Delta L = \frac{10}{360} 2\pi R_2$$

and the DGD change is given by the equation:

$$\Delta DGD = \frac{0.5 C_s \left(\frac{r}{R_2}\right)^2 \Delta L}{c} - \frac{0.5 C_s \left(\frac{r}{R_1}\right)^2 \Delta L}{c}$$

wherein $C_s$ is the stress-optics coefficient and c is the speed of light.

Figure 6:
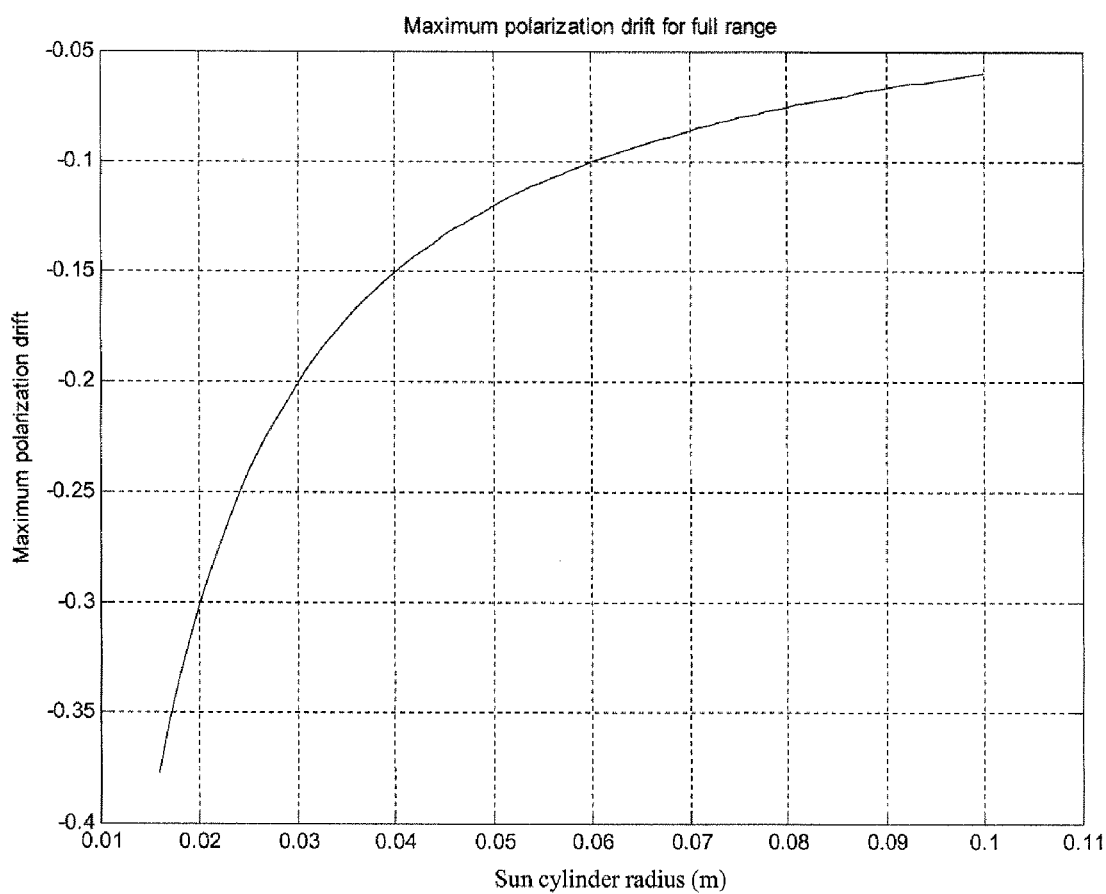
FIG. 6 is a graph of the maximum polarization drift for a fall range.
Figure 7:
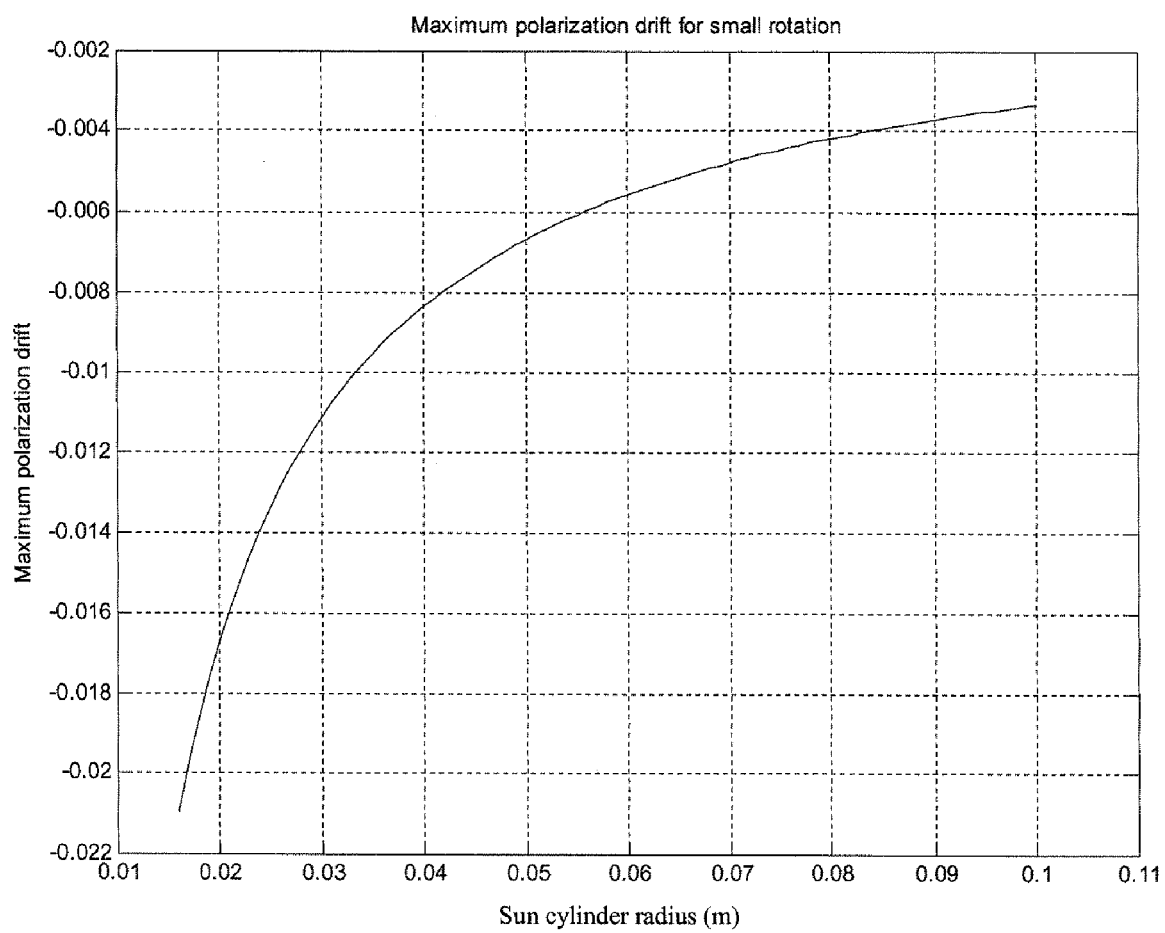
FIG. 7 is a graph of the maximum polarization drift for a small rotation.

The maximum possible polarization drift is given by the equation:

$$2\pi \Delta DGD \frac{c}{\lambda}$$

wherein $\lambda$ is optical wavelength. FIGS. 6 and 7 show plots of the maximum possible polarization drift plotted in for a 20° rotation. FIG. 6 is a plot of the maximum polarization drift for a full range, while FIG. 7 is a plot of the maximum polarization drift for a small rotation. The maximum bend radius may be less than 1 inch, 1 inch, 1.25 inches, 1.5 inches, 1.75 inches, 2 inches, 2.25 inches, 2.5 inches, any intermediate radius, or any larger radius.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A fiber wrap comprising:
   a sun gear;
   a sun cylinder coupled to the sun gear;
   a planetary gear in contact with the sun gear;
   a planetary cylinder coupled to the planetary gear;
   an outer housing in contact with the planetary gear; and
   a data cable, wherein the data cable wraps at least partially around an outer diameter of the sun cylinder, an outer diameter of the planetary cylinder, and an inner diameter of the outer housing, wherein the data cable only bends during use of the fiber wrap.

2. The fiber wrap of claim 1, wherein the data cable is not twisted.

3. The fiber wrap of claim 1, further comprising a hollow axel that is coupled to the sun gear, through which the data cable passes.

4. The fiber wrap of claim 1, wherein the sun cylinder is comprised of an upper portion and a lower portion, wherein the upper portion and the lower portion are coupled together.

5. The fiber wrap of claim 4, wherein the upper portion of sun cylinder has a smaller diameter than the lower portion of sun cylinder.

6. The fiber wrap of claim 5, wherein the upper portion and lower portion of sun cylinder are two distinct units.

7. The fiber wrap of claim 4, wherein the lower portion of the sun cylinder has a slot extending from the center of the sun cylinder to the outer edge of the lower portion of the sun cylinder though which the data cable passes.

8. The fiber wrap of claim 7, wherein the upper surface of the lower portion of the sun cylinder has a groove in which the data cable sits.

9. The fiber wrap of claim 4, wherein the upper portion of sun cylinder has a channel in the outer surface in which the data cable sits.

10. The fiber wrap of claim 1, wherein the data cable is a fiber optics cable.

11. The fiber wrap of claim 10, wherein the data cable is one of a 0.9 mm cable, a 1.8 mm cable, a 2.0 mm cable, 2.4 mm cable, a 2.8 mm cable, and a 3.0 mm cable.

12. The fiber wrap of claim 4, wherein the inner surface of the outer housing has a channel in which the data cable sits.

13. The fiber wrap of claim 12, further comprising a slip ring to hold the data cable in the channel in the inner surface of the outer housing.

14. The fiber wrap of claim 13, wherein the slip ring is comprised of a low friction material.

15. The fiber wrap of claim 14, wherein the coefficient of friction between the slip ring and the outer housing is less than one of 0.3, 0.2, and 0.1.

16. The fiber wrap of claim 1, further comprising a cover coupled to the outer housing.

17. The fiber wrap of claim 16, wherein the axel extends through the cover.

18. The fiber wrap of claim 16, wherein the cover is transparent.

19. A method of rotating a fiber wrap without twisting a data cable comprising the steps of:
   (a) passing the data cable through a central axel;
   (b) passing the data cable out of the central axel into a slot in a lower portion of a sun cylinder;
   (c) wrapping the data cable at least part way around the lower portion of the sun cylinder;
   (d) routing the data cable into a groove on a face of the lower portion of the sun cylinder;
   (e) passing the data cable into a channel in the outer surface of an upper portion of the sun cylinder;
   (f) wrapping the data cable around the upper portion of sun cylinder at least one time;
   (g) passing the data cable into a channel in the surface of a planetary cylinder;
   (h) wrapping the data cable at least partly around the planetary cylinder;
   (i) passing the data cable into a channel in an inner surface of an outer housing; and
   (j) passing the data cable through a slot in the outer housing.

20. The method of claim 19, wherein only a portion of the data cable is in motion while the fiber wrap is in operation.

21. The method of claim 19, wherein the data cable is one of a 0.9 mm cable, a 1.8 mm cable, a 2.0 mm cable, 2.4 mm cable, a 2.8 mm cable, and a 3.0 mm cable.

22. The method of claim 19, wherein a slip ring holds the data cable in the channel in the inner surface of the outer housing.

23. The method of claim 22, wherein the slip ring is comprised of a low friction material.

24. The method of claim 23, wherein the coefficient of friction between the slip ring and the outer housing is less than one of 0.3, 0.2, and 0.1.

25. The method of claim 19, wherein a cover is coupled to the housing.

26. The method of claim 25, wherein the axel extends through the cover.

27. The method of claim 25, wherein the cover is transparent.

28. A fiber wrap comprising:
   a sun gear;
   a sun cylinder coupled to the sun gear;
   a planetary gear in contact with the sun gear;
   a planetary cylinder coupled to the planetary gear;
   an outer housing in contact with the planetary gear;
   a data cable coupled to the sun cylinder, the planetary cylinder, and the outer housing, wherein the data cable only bends during use of the fiber wrap; and
   a slip ring to hold the data cable in a channel in the inner surface of the outer housing.

* * * * *

UNITED STATES PATENT AND TRADEMARK OFFICE
CERTIFICATE OF CORRECTION

PATENT NO. : 7,574,091 B2 Page 1 of 1
APPLICATION NO. : 11/925464
DATED : August 11, 2009
INVENTOR(S) : Silversun Sturgis It is certified that error appears in the above-identified patent and that said Letters Patent is hereby corrected as shown below:

The following should be inserted before the section entitled "Field of the Invention":

--RIGHTS IN THE INVENTION

This invention was made with government support under Cooperative Agreement AST-0223851, between the National Science Foundation and Associated Universities, Inc., and, accordingly, the United States government has certain rights in this invention.--

Column 4, lines 44-45 read:
"provides new tools and methods of controlling adhesive migration and, in particular, migration in an assembly."; it should read --provides new tools and methods of rotating a fiber wrap without twisting the data cable.--

Column 5, line 12 reads:
"In another embodiment, a low friction slip ring to hold the"; it should read --In another embodiment, there is a low friction slip ring to hold the--

Signed and Sealed this

Nineteenth Day of October, 2010

David J. Kappos
*Director of the United States Patent and Trademark Office*